United States Patent
Liu

(10) Patent No.: US 11,393,190 B2
(45) Date of Patent: Jul. 19, 2022

(54) OBJECT IDENTIFICATION METHOD AND RELATED MONITORING CAMERA APPARATUS

(71) Applicant: VIVOTEK INC., New Taipei (TW)

(72) Inventor: Cheng-Chieh Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 252 days.

(21) Appl. No.: 16/828,951

(22) Filed: Mar. 24, 2020

(65) Prior Publication Data
US 2021/0192212 A1 Jun. 24, 2021

(30) Foreign Application Priority Data

Dec. 23, 2019 (TW) .................. 108147279

(51) Int. Cl.
G06K 9/62 (2022.01)
G06V 20/52 (2022.01)
G06V 20/10 (2022.01)
G06V 10/147 (2022.01)

(52) U.S. Cl.
CPC .......... *G06V 20/10* (2022.01); *G06K 9/6215* (2013.01); *G06V 10/147* (2022.01)

(58) Field of Classification Search
USPC ....................................................... 382/103
See application file for complete search history.

(56) References Cited

U.S. PATENT DOCUMENTS

| 8,194,134 B2* | 6/2012 | Furukawa | G01S 3/7865 348/169 |
|---|---|---|---|
| 10,186,042 B2* | 1/2019 | Liu | G06T 7/11 |
| 11,176,382 B2* | 11/2021 | Barman | G06K 9/00771 |
| 2018/0253596 A1* | 9/2018 | Barman | G06K 9/209 |

FOREIGN PATENT DOCUMENTS

| TW | 200820099 | 5/2008 |
|---|---|---|
| TW | 201719573 A | 6/2017 |
| TW | 201937404 A | 9/2019 |

OTHER PUBLICATIONS

Liu et al., The Manhunt Network: People Tracking in Hybrid-Overlapping Under the Vertical Top-view Depth Camera Network, 2016IEEE 978-5090-5102-1/16, pp. 1-6. (Year: 2016).*
Brousseau et al., Calibration of Axial Fisheye Camera Through Generic Virtual Central Models, 2019 IEEE 2380-7504/19, pp. 4039-4047. (Year: 2019).*

* cited by examiner

*Primary Examiner* — Ishrat I Sherali
(74) *Attorney, Agent, or Firm* — Winston Hsu

(57) ABSTRACT

An object identification method determines whether a first monitoring image and a second monitoring image captured by a monitoring camera apparatus have the same object. The object identification method includes acquiring the first monitoring image at a first point of time to analyze a first object inside a first angle of view of the first monitoring image, acquiring the second monitoring image at a second point of the time different from the first point of time to analyze a second object inside the first angle of view of the second monitoring image, estimating a first similarity between the first object inside the first angle of view of the first monitoring image and the second object inside the first angle of view of the second monitoring image; and determining whether the first object and the second object are the same according to comparison result of the first similarity with a threshold.

20 Claims, 17 Drawing Sheets

OBJECT IDENTIFICATION METHOD AND RELATED MONITORING CAMERA APPARATUS

BACKGROUND OF THE INVENTION

1. Field of the Invention

The present invention relates to an object identification method and a monitoring camera apparatus, and more particularly, to an object identification method of determining whether two monitoring images have the same object and a related monitoring camera apparatus.

2. Description of the Prior Art

Object identification technology is popularly applied for security surveillance; for example, monitoring images captured by the same camera in different periods, or captured by different cameras in the same or different periods, can be applied to execute object comparison and identification. The monitoring camera is installed on the wall or a kickstand, and captures the monitoring image containing a pattern of an object in a specific angle of view. The conventional object identification technology acquires one or some characteristic vectors of the object inside the monitoring image, and analyzes similarity of the characteristic vectors to determine whether the plural of monitoring images contains the same object. However, color or pattern of the object in different capturing orientation may be diverse; for example, the front side and the rear side of the passerby may show different color and/or different patterns. The conventional object identification technology easily misjudges a determination result in response to determination of whether the objects in different monitoring images are the same. Design of an object identification method capable of overcoming angle difference of view is an important issue in the monitoring industry.

SUMMARY OF THE INVENTION

The present invention provides an object identification method of determining whether two monitoring images have the same object and a related monitoring camera apparatus for solving above drawbacks.

According to the claimed invention, an object identification method of determining whether a first monitoring image and a second monitoring image captured by a monitoring camera apparatus have the same object is disclosed. The object identification method includes acquiring the first monitoring image at a first point of time to analyze a first object inside a first angle of view of the first monitoring image, acquiring the second monitoring image at a second point of the time different from the first point of time to analyze a second object inside the first angle of view of the second monitoring image, estimating a first similarity between the first object inside the first angle of view of the first monitoring image and the second object inside the first angle of view of the second monitoring image, and determining whether the first object and the second object are the same one according to a comparison result of the first similarity with a threshold.

According to the claimed invention, a monitoring camera apparatus includes an image receiver and an operation processor. The image receiver is adapted to capture a first monitoring image and a second monitoring image. The operation processor is electrically connected to the image receiver. The operation processor acquires the first monitoring image at a first point of time to analyze a first object inside a first angle of view of the first monitoring image, acquires the second monitoring image at a second point of the time different from the first point of time to analyze a second object inside the first angle of view of the second monitoring image, estimates a first similarity between the first object inside the first angle of view of the first monitoring image and the second object inside the first angle of view of the second monitoring image, and determines whether the first object and the second object are the same one according to a comparison result of the first similarity with a threshold, so as to determining whether the first monitoring image and the second monitoring image have the same object.

According to the claimed invention, a monitoring camera apparatus includes a first image receiver, a second image receiver and an operation processor. The first image receiver is adapted to capture a first monitoring image. The second image receiver is adapted to capture a second monitoring image. The operation processor is electrically connected to the first image receiver and the second image receiver. The operation processor acquires the first monitoring image at a first point of time to analyze a first object inside a first angle of view of the first monitoring image, acquires the second monitoring image at a second point of the time different from the first point of time to analyze a second object inside the first angle of view of the second monitoring image, estimates a first similarity between the first object inside the first angle of view of the first monitoring image and the second object inside the first angle of view of the second monitoring image, and determines whether the first object and the second object are the same one according to a comparison result of the first similarity with a threshold, so as to determining whether the first monitoring image and the second monitoring image have the same object.

The object identification method of the present invention can acquire the characteristic values or vectors about the object located inside the same angle of view of the first monitoring image and the second monitoring image when the object moves in different directions. The characteristic values or vectors acquired by the monitoring images, which contain the object located inside the same or approximate angle of view, can be compared for improving identification misjudgment resulted from angle difference of view. Besides, the object identification method can utilize some information of the object, such as the dimension and/or the visible area ratio, to estimate the related similarity via weighting adjustment, so as to provide the preferred object identification accuracy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
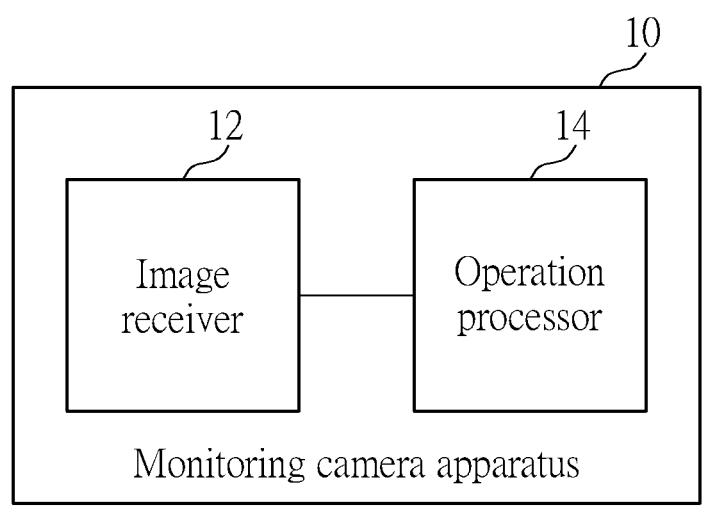
FIG. 1 is a functional block diagram of a monitoring camera apparatus according to a first embodiment of the present invention.
Figure 2:
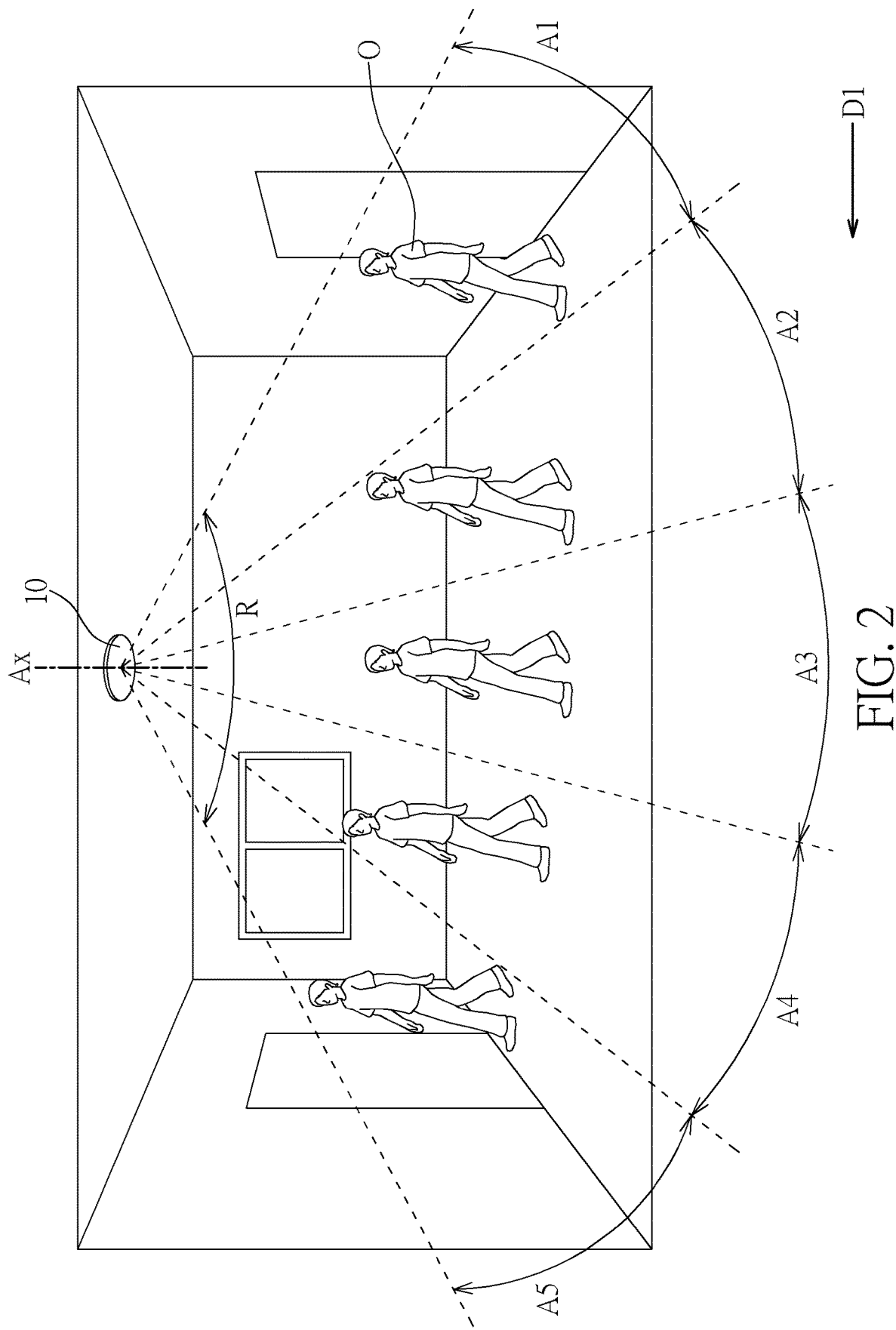
FIG. 2 is a diagram of positions of an object passing a monitoring range of the monitoring camera apparatus along a first direction in different points of time according to the first embodiment of the present invention.
Figure 3:
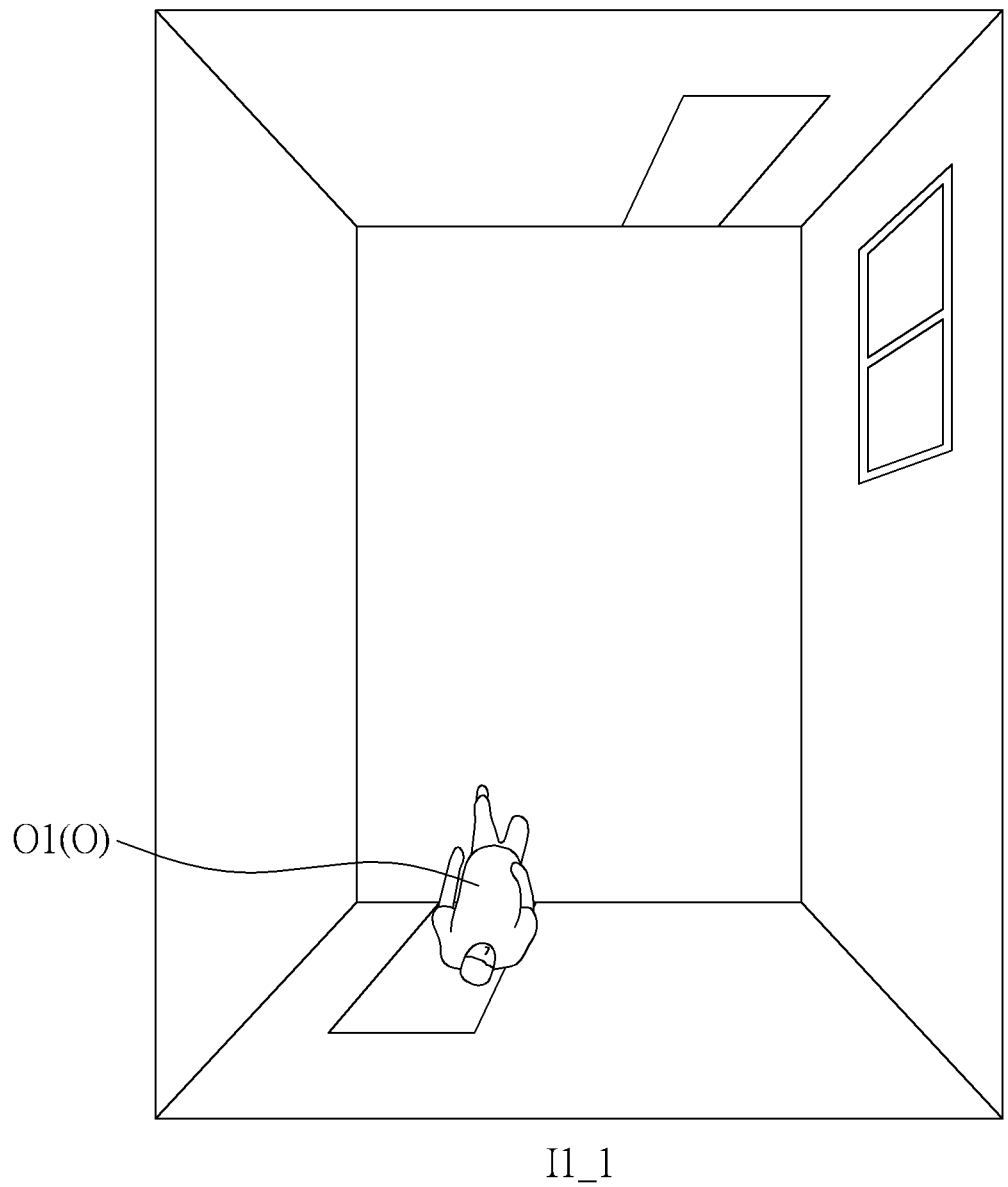
FIG. 3 to FIG. 7 are diagrams of images captured by the monitoring camera apparatus at each point of time shown in FIG. 2.
Figure 4:
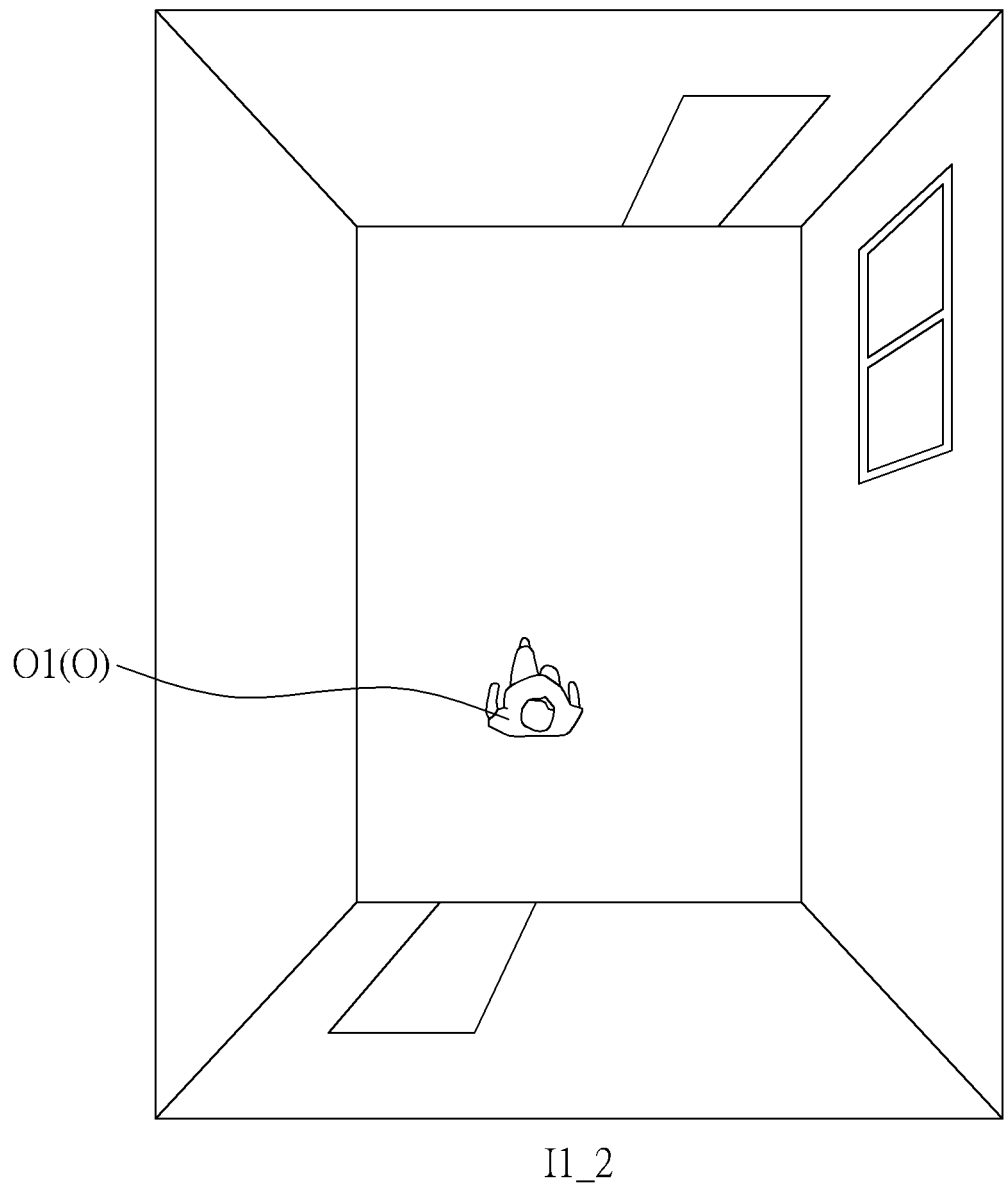
Figure 5:
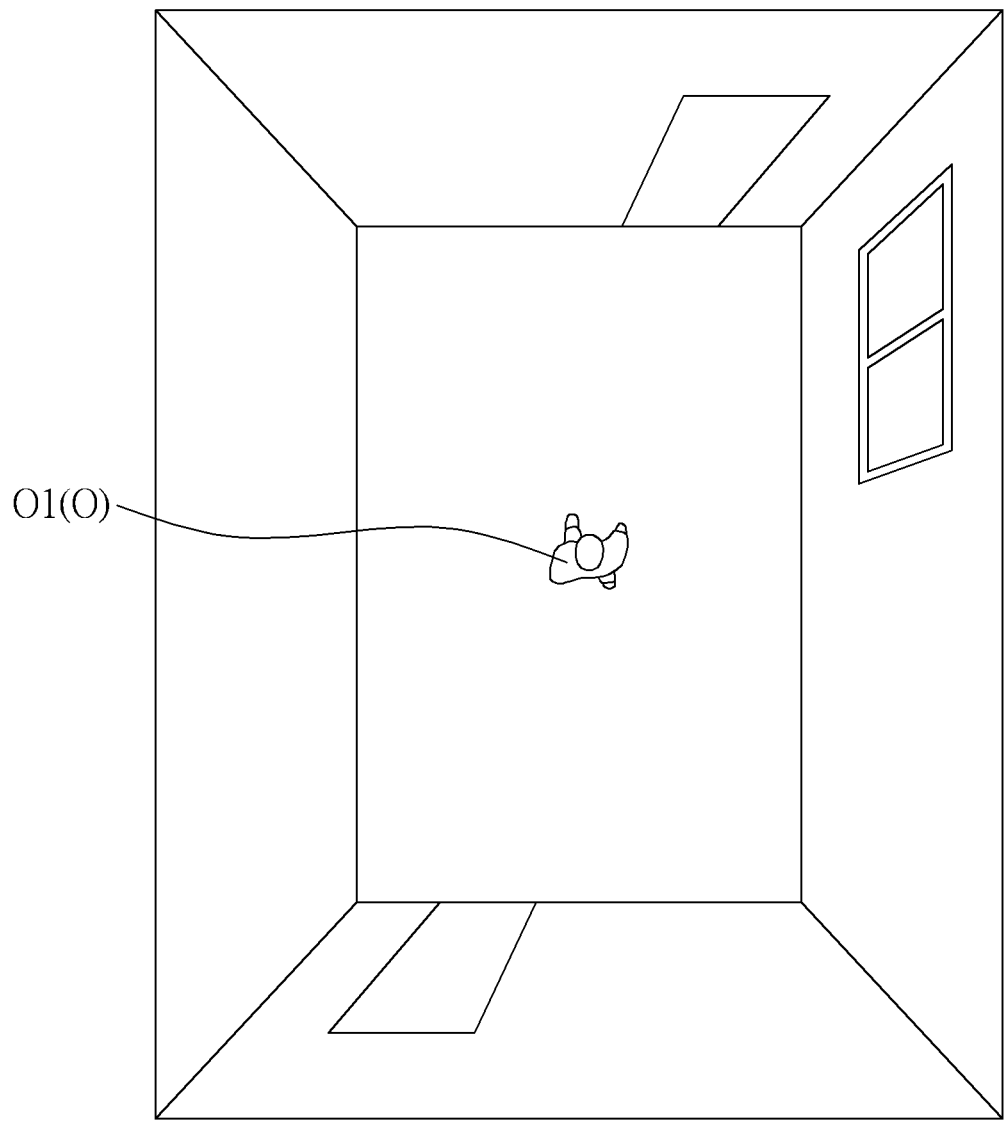
Figure 6:
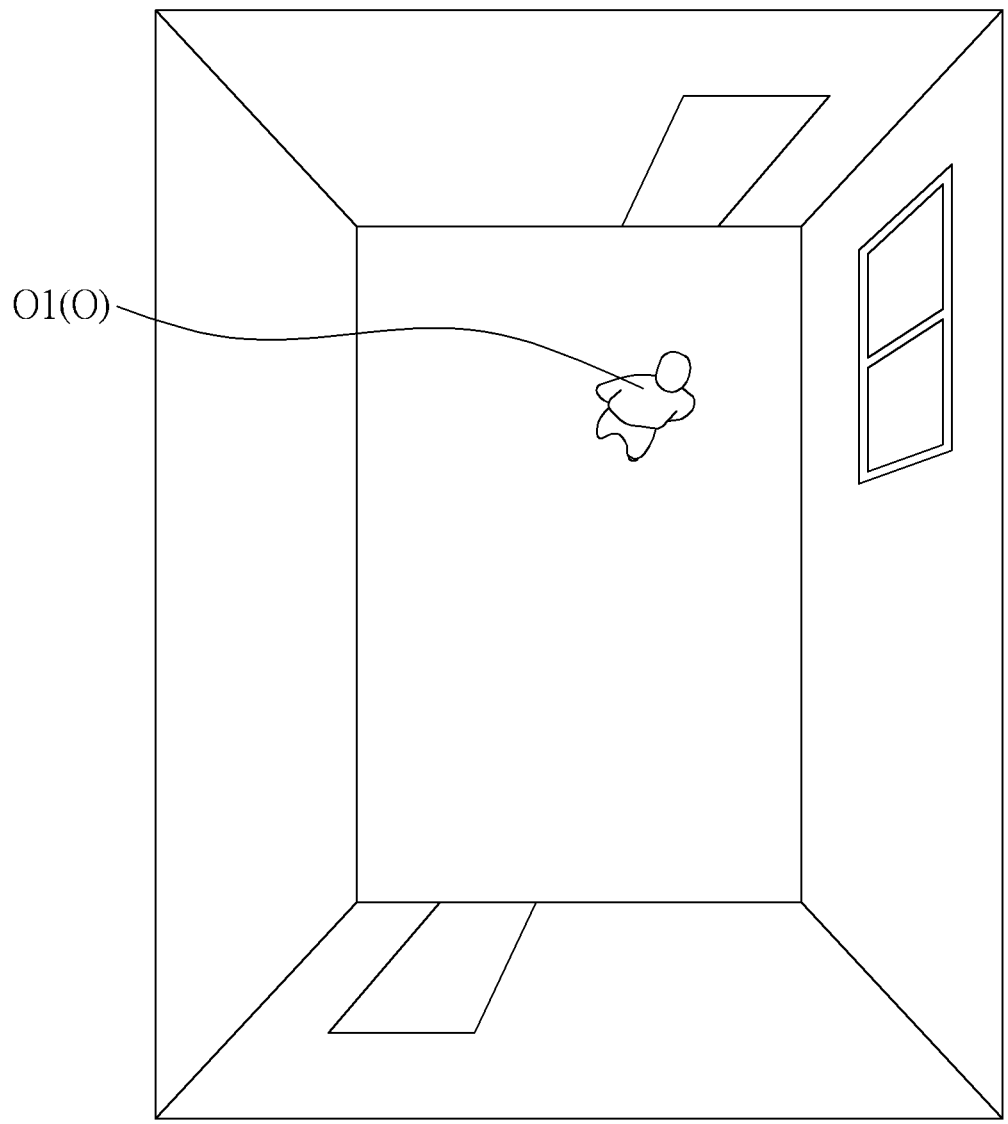
Figure 7:
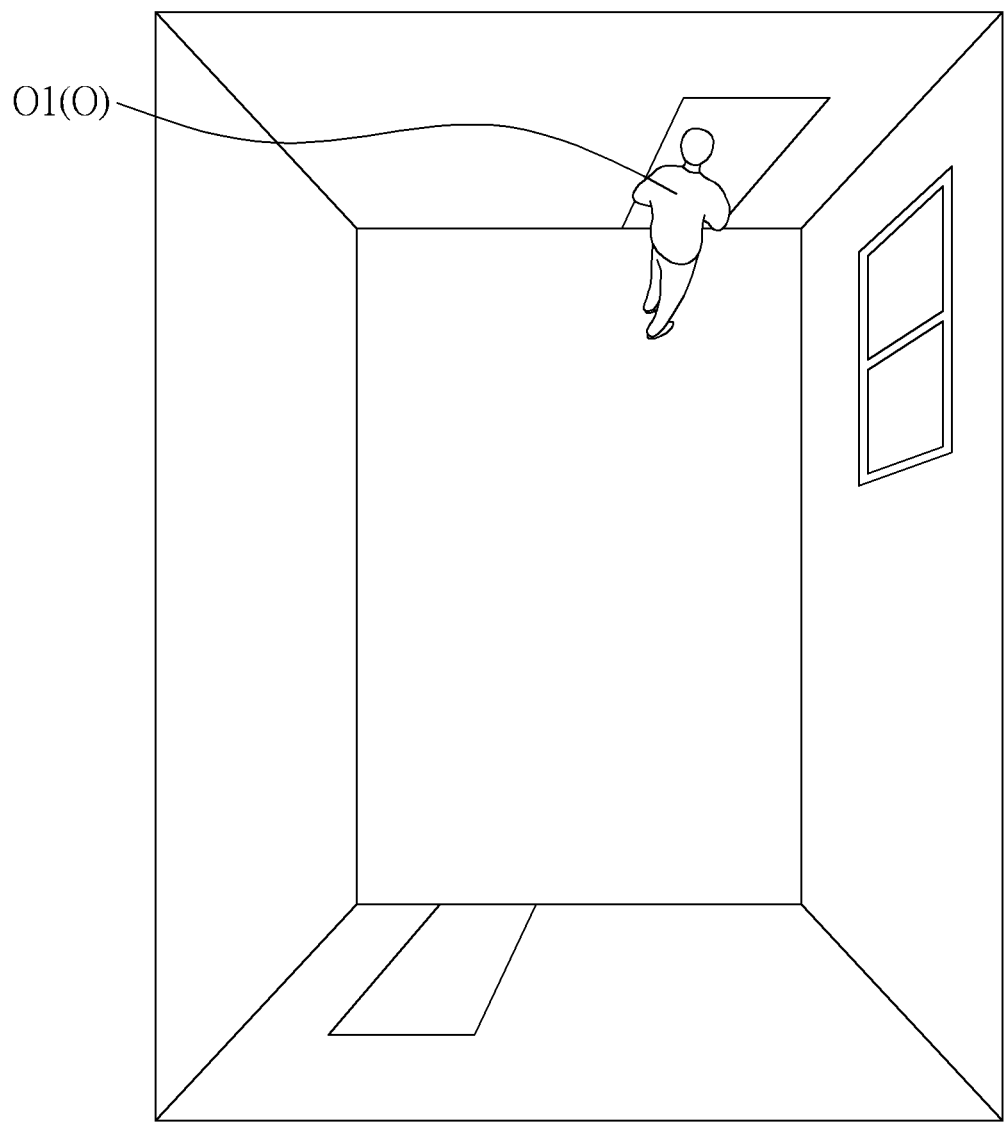
Figure 8:
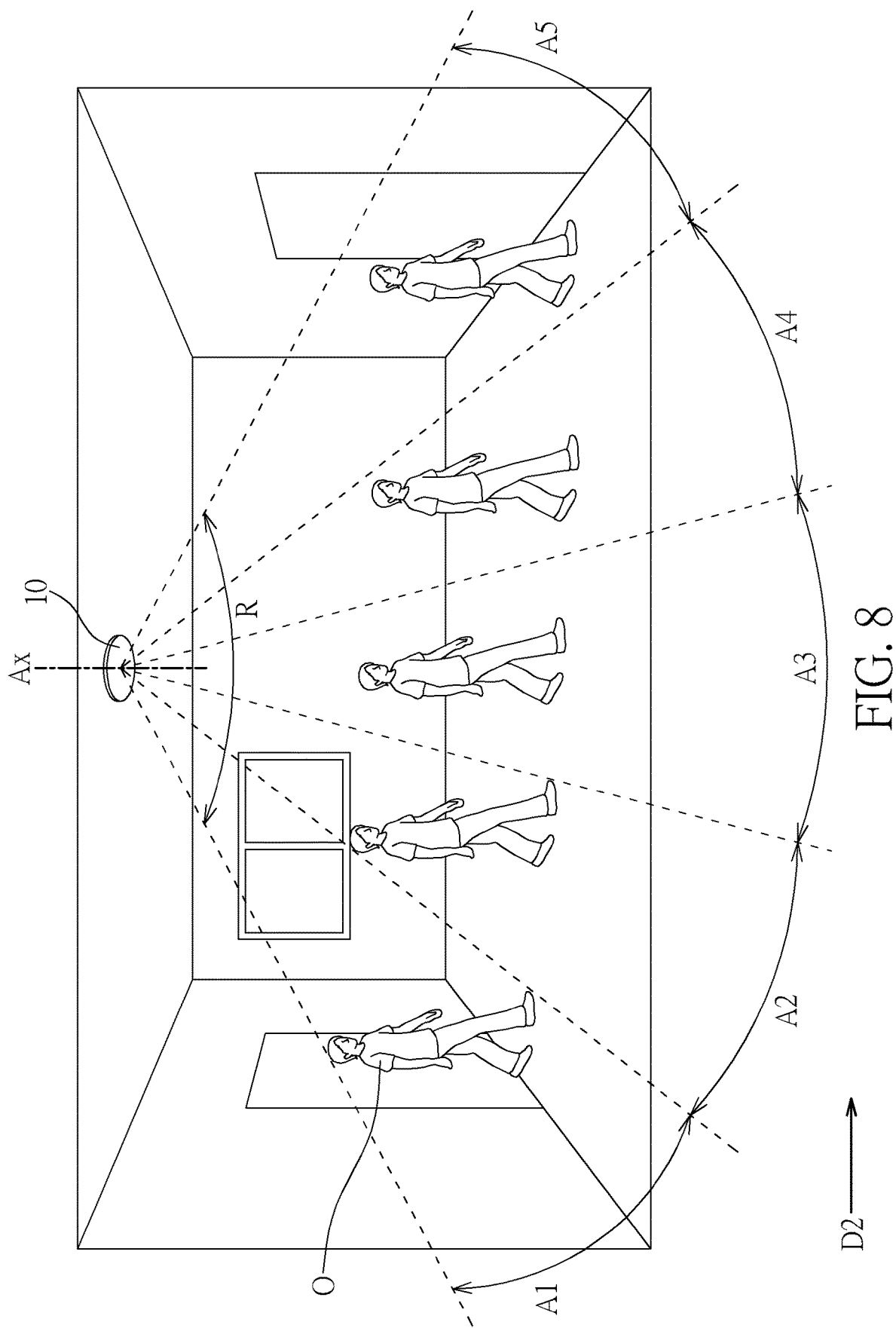
FIG. 8 is a diagram of positions of the object passing the monitoring range of the monitoring camera apparatus along a second direction in different points of time according to the first embodiment of the present invention.
Figure 9:
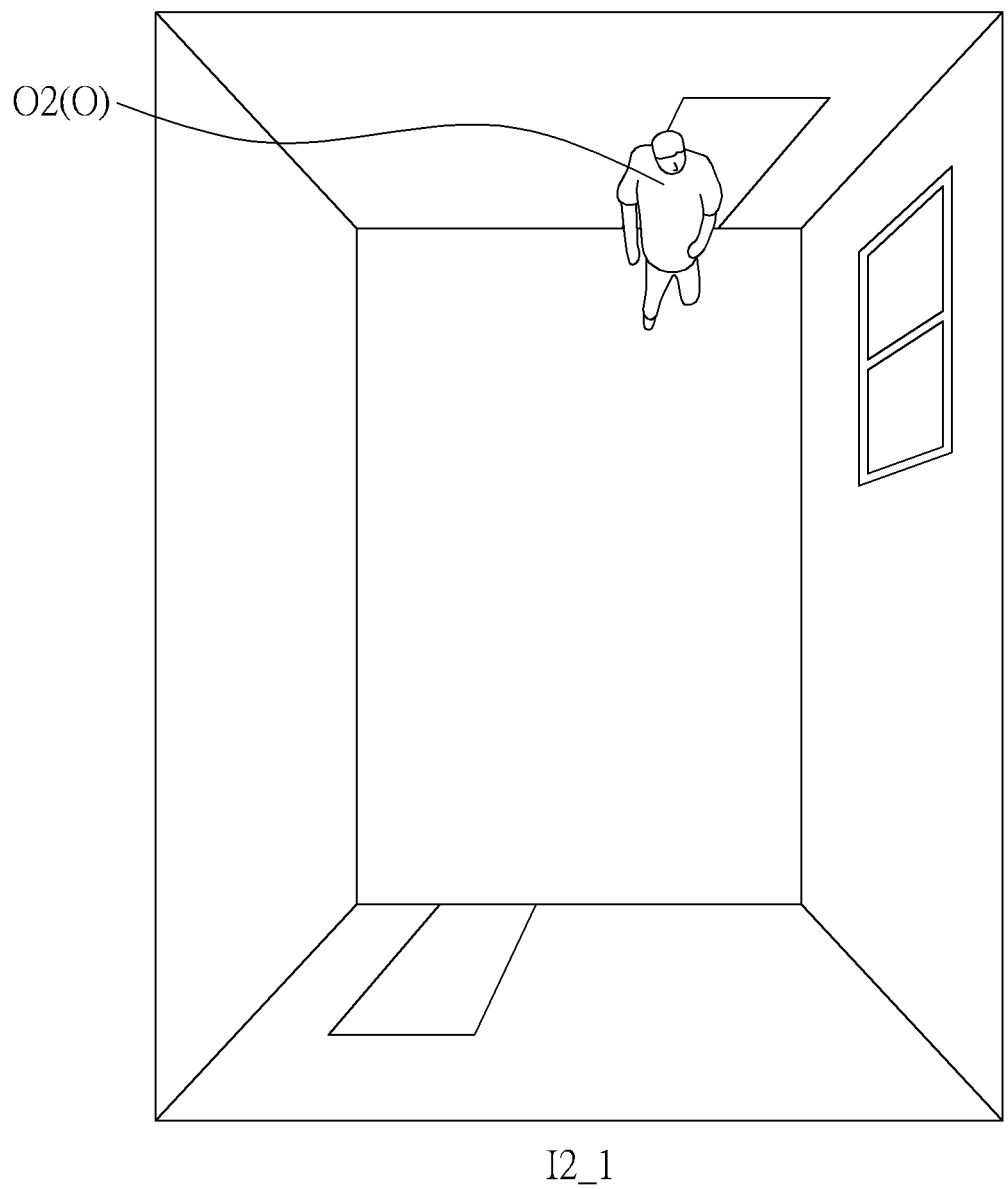
FIG. 9 to FIG. 13 are diagrams of images captured by the monitoring camera apparatus at each point of time shown in FIG. 8.
Figure 10:
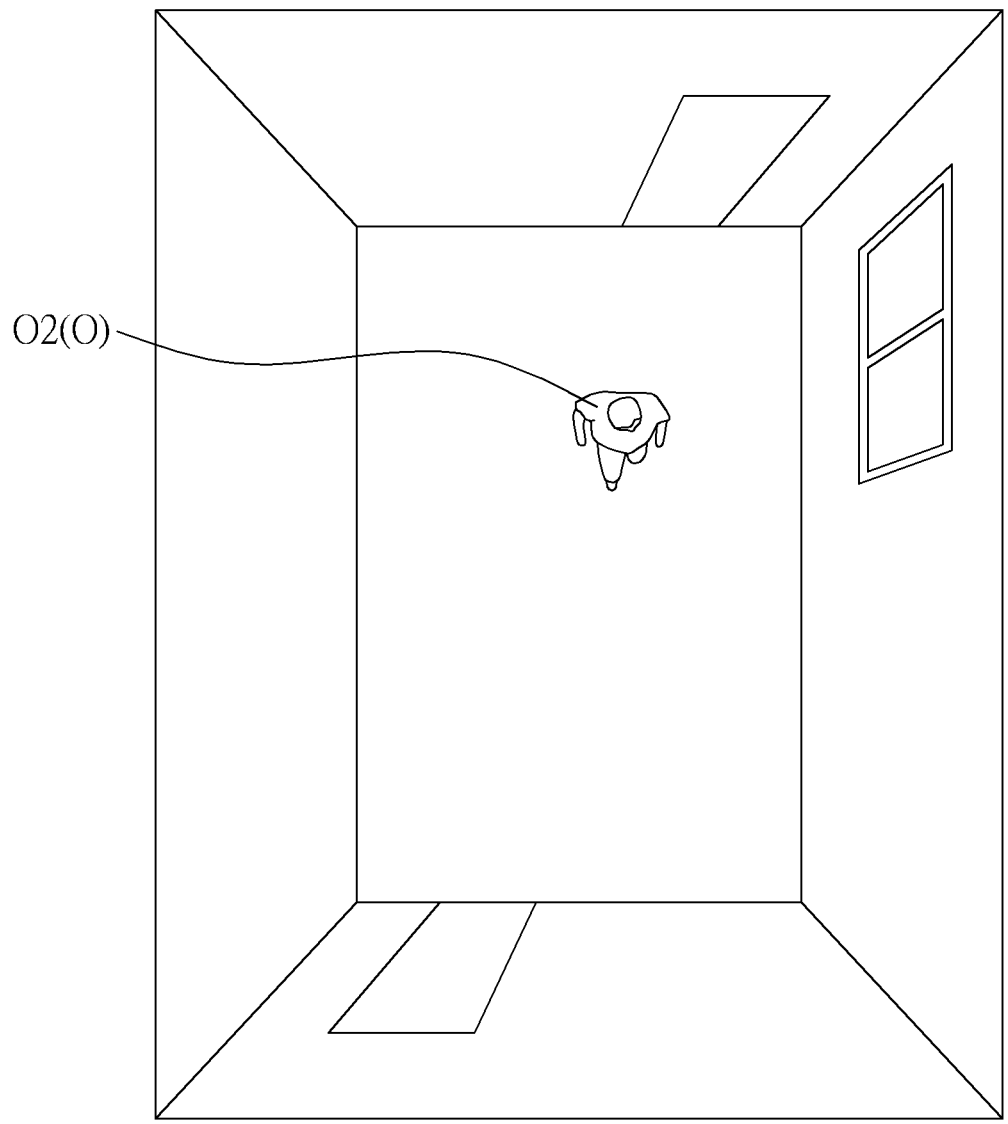
Figure 11:
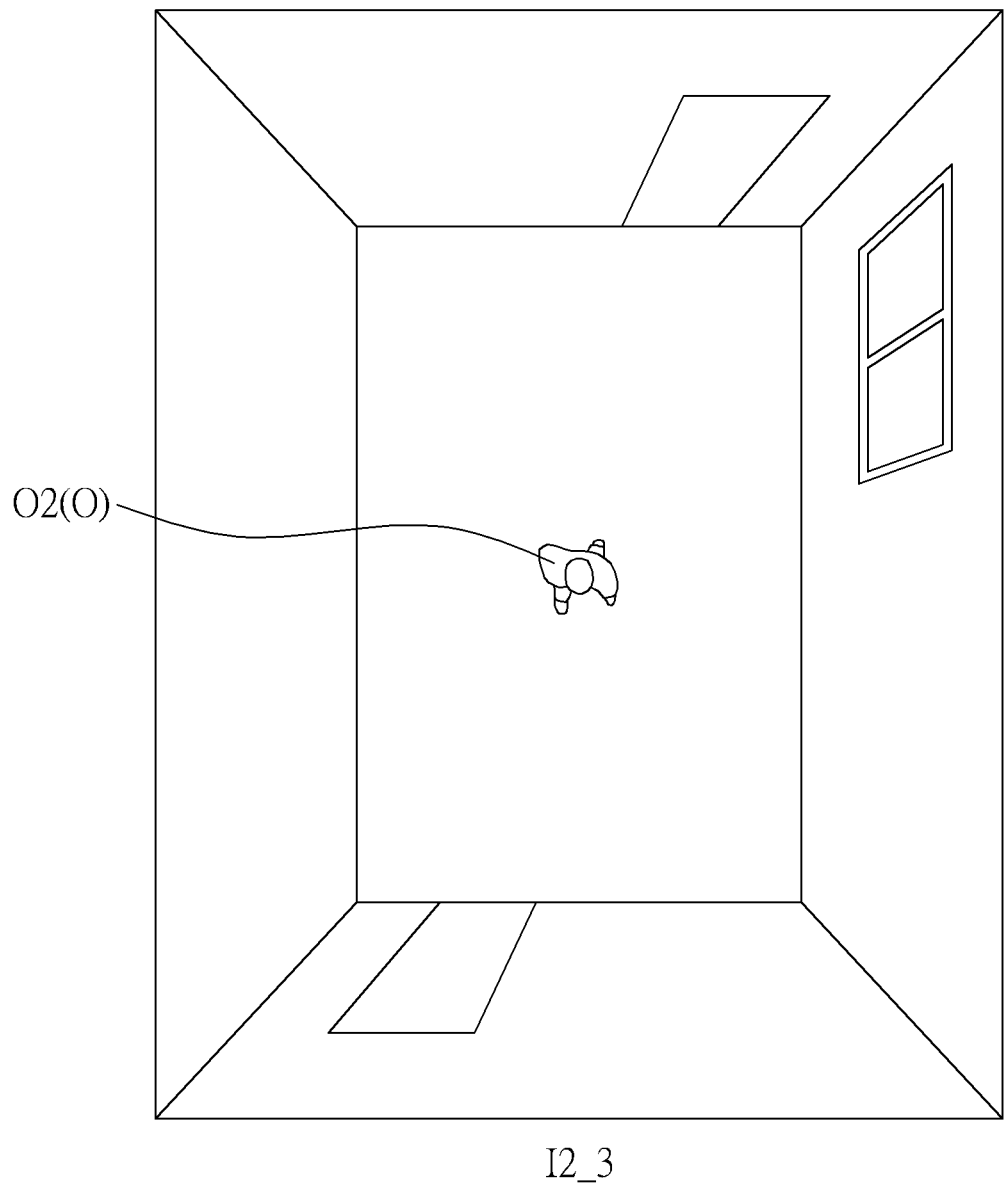
Figure 12:
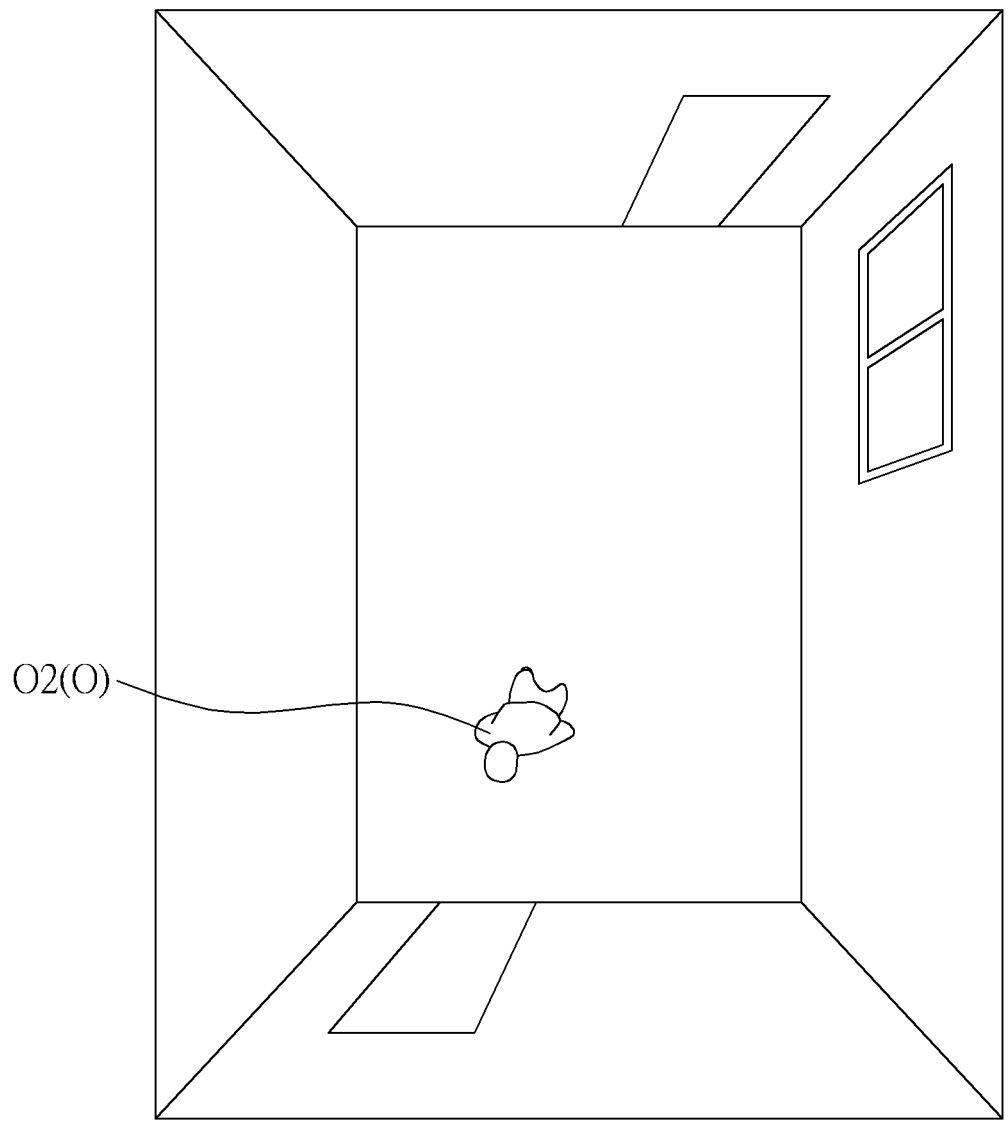
Figure 13:
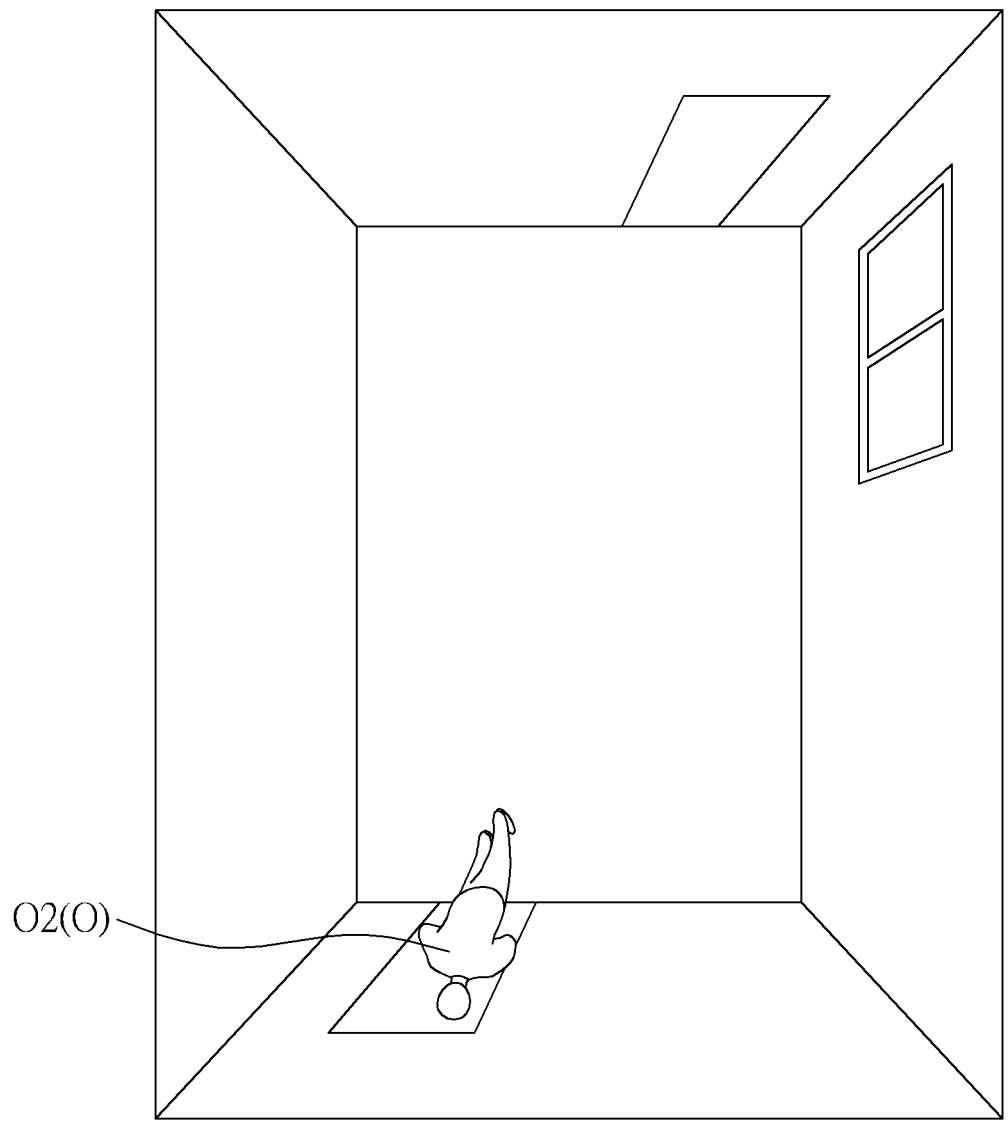
Figure 14:
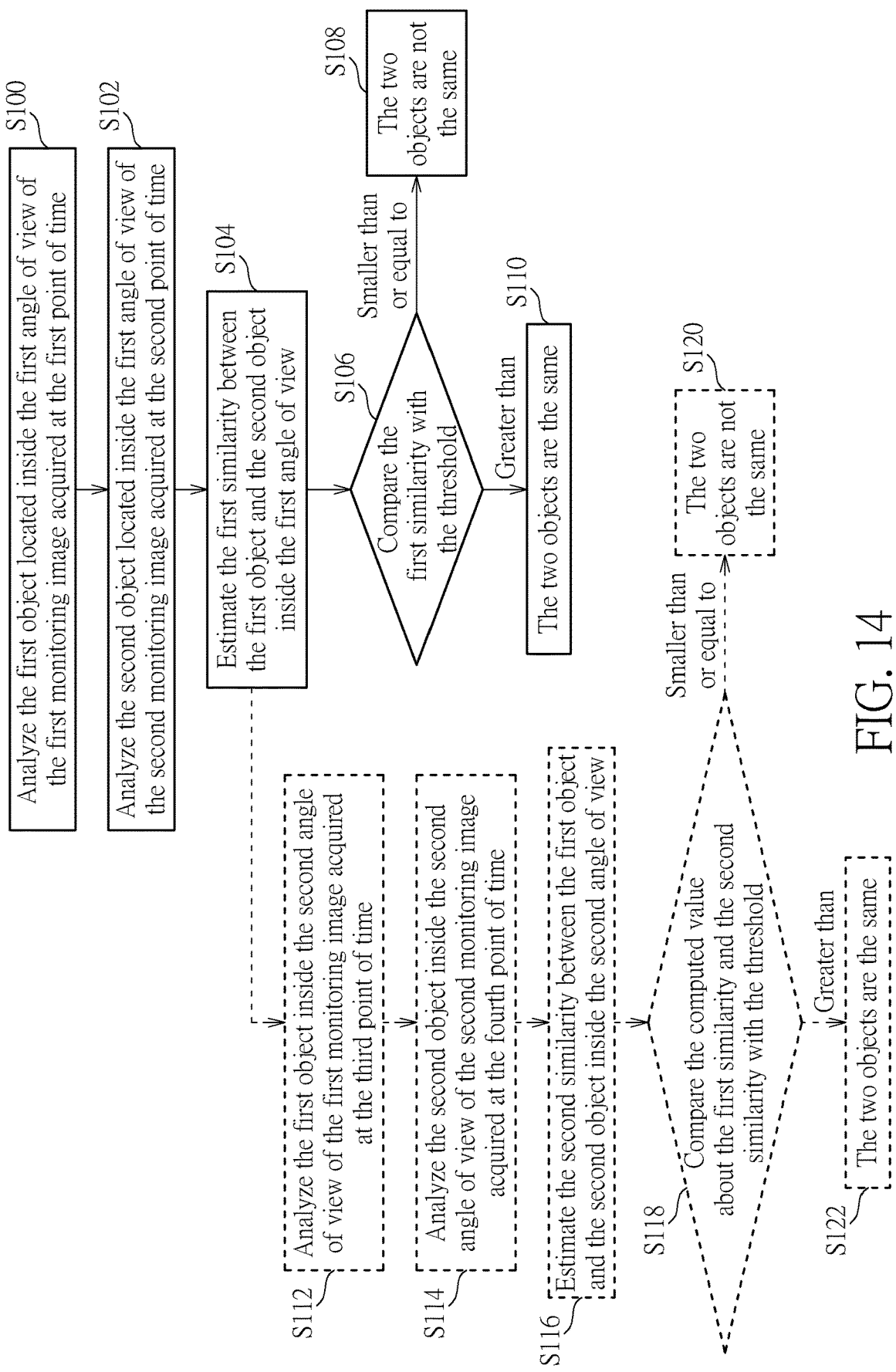
FIG. 14 is a flow chart of an object identification method according to an embodiment of the present invention.

Please refer to FIG. 1 to FIG. 14. FIG. 1 is a functional block diagram of a monitoring camera apparatus 10 according to a first embodiment of the present invention. FIG. 2 is a diagram of positions of an object O passing a monitoring range R of the monitoring camera apparatus 10 along a first direction D1 in different points of time according to the first embodiment of the present invention. FIG. 3 to FIG. 7 are diagrams of images captured by the monitoring camera apparatus 10 at each point of time shown in FIG. 2. FIG. 8 is a diagram of positions of the object O passing the monitoring range R of the monitoring camera apparatus 10 along a second direction D2 in different points of time according to the first embodiment of the present invention. FIG. 9 to FIG. 13 are diagrams of images captured by the monitoring camera apparatus 10 at each point of time shown in FIG. 8. FIG. 14 is a flow chart of an object identification method according to an embodiment of the present invention.

The monitoring camera apparatus 10 can include an image receiver 12 and an operation processor 14 electrically connected to each other, and used to identify the object O moved into the monitoring range R. In the embodiment, the object can represent a passerby, or a moving vehicle or any moving matter. The image receiver 12 can capture a plurality of images at several points of time, or receive the plurality of images captured by an external camera at several points of time. The operation processor 14 can execute the object identification method of the present invention, to determine whether the plurality of images have the same object. In addition, the monitoring range R of the monitoring camera apparatus 10 can be indoor place shown in FIG. 2 to FIG. 7, such as a hallway between outdoor place and inner space of the market; however, an application of the monitoring range R is not limited to the above-mentioned embodiment, for example, the monitoring range R can be the outdoor place, or connection space containing the indoor space and the outdoor space.

The monitoring range R of the monitoring camera apparatus 10 (or the image receiver 12) can have a central axis Ax, and further can be divided into a first angle of view A1, a second angle of view A2, a third angle of view A3, a fourth angle of view A4 and a fifth angle of view A5 optionally. The first angle of view A1 and the fifth angle of view A5 can be set symmetrically, and the second angle of view A2 and the fourth angle of view A4 can be set symmetrically, which depends on design demand. When the object O passes through the monitoring range R in the first direction D1, the monitoring camera apparatus 10 can sequentially acquire the first monitoring images I1_1, I1_2, I1_3, I1_4 and I1_5, which contains the first object O1 respectively located inside the five angles of view A1~A5. When the object O passes through the monitoring range R in the second direction D2, the monitoring camera apparatus 10 can sequentially acquire the second monitoring images I2_1, I2_2, I2_3, I2_4 and I2_5, which contains the second object O2 respectively located inside the five angles of view A1~A5. In the present invention, amounts of the angle of view and the monitoring image are not limited to the above-mentioned embodiment, and depend on the design demand.

The object identification method of the present invention can execute steps S100 and S102, to analyze the first monitoring image I1_1 acquired at the first point of time for searching the first object O1 located inside the first angle of view A1, and further to analyze the second monitoring image I2_1 acquired at the second point of the time different from the first point of time for searching the second object O2 located inside the first angle of view A1. In the meantime, the first angle of view A1 of the first monitoring image I1_1 and the first angle of view A1 of the second monitoring image I2_1 can be symmetrically located at two opposite sides of the central axis Ax. Then, step S104 can be executed to estimate a first similarity between the first object O1 inside the first angle of view A1 of the first monitoring image I1 and the second object O2 inside the first angle of view A1 of the second monitoring image I2 via specific algorithm. Then, step S106 can be executed to compare the first similarity with a predefined threshold. If the first similarity is smaller than or equal to the threshold, the first object O1 is different from the second object O2, and step S108 can be executed to determine the first object O1 and the second object O2 are not the same object; if the first similarity is greater than the threshold, step S110 can be executed to determine the first object O1 and the second object O2 are the same.

In step S104, similarity estimation can be executed via a variety of similarity metric function, cosine similarity computation or Euclidean distance computation, which has an aim of extracting characteristic values or vectors of the first object O1 and the second object O2 for comparison; an actual application of the similarity estimation is not limited to the above-mentioned embodiment. The present invention preferably may utilize neural network to extract the characteristic vectors from the first object O1 and the second object O2 for the similarity estimation, and then an estimating value of the similarity estimation can be used to identify the object. Further, the present invention may utilize the neural network to directly identify the first object O1 and the second object O2.

For increasing identification accuracy, the object identification method can optionally execute steps S112 and S114 after step S104, to analyze another first monitoring image I1_2 acquired at the third point of time for searching the first object O1 inside the second angle of view A2, and further to analyze another second monitoring image I2_2 acquired at the fourth point of the time different from the third point of time for searching the second object O2 inside the second angle of view A2. Then, steps S116 and S118 can be executed to estimate a second similarity between the first object O1 inside the first monitoring image I1_2 and the second object O2 inside the second monitoring image I2_2, and compute a computed value about the first similarity and the second similarity for comparing with the predefined threshold. If the computed value is smaller than or equal to the threshold, step S120 can be executed to determine the first object O1 and the second object O2 are not the same object; if the computed value is greater than the threshold, step S122 can be executed to determine the first object O1 and the second object O2 are the same.

For further increasing the identification accuracy, the object identification method can further estimate a third similarity between the first object O1 inside the third angle of view A3 of the first monitoring image I1_3 and the second object O2 inside the third angle of view A3 of the second monitoring image I2_3, a fourth similarity between the first object O1 inside the fourth angle of view A4 of the first monitoring image I1_4 and the second object O2 inside the fourth angle of view A4 of the second monitoring image I2_4, and/or a fifth similarity between the first object O1 inside the fifth angle of view A5 of the first monitoring image I1_5 and the second object O2 inside the fifth angle of view A5 of the second monitoring image I2_5. The computed value about the first similarity, the second similarity, the third similarity, the fourth similarity and the fifth similarity can be compared with the predefined threshold, for determining whether the first object O1 and the second object O2 are the same object. The computed value can be a mean value of all the similarity, or the mean value of some similarity excluding one or several extreme values. Besides, each image set (which includes one first monitoring image and one second monitoring image having the same angle of view) can be weighted by a related weighting value in accordance with resolution of the said image set for computing the computed value; for example, the high resolution image can be matched with the high weighting value, and the low resolution image can be matched with the low weighting value or abandoned, and the computed value can be the mean value of the weighted similarity.

The object O may show identical vision details inside the same or approximate angle of view of the monitoring images. For example, the monitoring images showing the object O inside the same angle of view may both capture a front side or a back side of the object O, or a similar ratio of a head to a body of the object O, so as to accurately determine the object in some monitoring images are the same one or not. Thus, when the object O enters and leaves the monitoring range R, the monitoring camera apparatus 10 can acquire at least two monitoring images, which contain the object O located at the same angle of view, and then determine whether the first object O1 moved in the first direction D1 and the second object O2 moved in the second direction D2 are the same. As the same object is confirmed, the object identification method of the present invention may count an amount of the object, and can be applied to customer statistic of the market by recording the amount of guest lounging around the market (such as the object moved into and away from the monitoring range); a staying period of the guest in the market can be acquired via time difference between the foresaid two monitoring images.

It should be mentioned that the object identification method may determine the first object O1 inside the first monitoring image I1_1 acquired at the first point of time being the same as the second object O2 inside the second monitoring image I2_1 acquired at the second point of the time, and then determine the first object O1 inside the first monitoring image I1_1 being the same as the second object inside another second monitoring image (not shown in the figures) acquired at another point of time different from the first point of time and the second point of the time; in the meantime, a cluster of objects passing through the monitoring range R along the second direction D2 may contain two objects with similar clothes or appearance, and the object identification method can estimate two similarities. One similarity having a great value can be used to decide the first monitoring image I1_1 is matched with the second monitoring image I2_1 acquired at the second point of the time, or matched with the another second monitoring image acquired at the another point of the time. Based on the above-mentioned function, the monitoring camera apparatus 10 of the present invention can include a memory (not shown in the figures) electrically connected to the operation processor 14 for storing some image information in a short term or a long term.

The object identification method of the present invention not only can determine similarities of some image sets of the first monitoring image and the second monitoring image having the object O located at different angles of view, but also can increase the identification accuracy by other ways. For instance, after step S116, the object identification method can compute a first dimension relevant to the first object O1 inside the first angle of view A1 of the first monitoring image I1_1 and the second object O2 inside the first angle of view A1 of the second monitoring image I2_1, and a second dimension relevant to the first object O1 inside the second angle of view A2 of the first monitoring image I1_2 and the second object O2 inside the second angle of view A2 of the second monitoring image I2_2. The first object O1 and the second object O2 in the first angle of view A1 can have the same or approximate dimension, so that the first dimension can be one dimension about the first object O1 or the second object O2, or be a mean value of dimensions about the first object O1 and the second object O2. Computation of the second dimension can correspond to computation of the first dimension, and a detailed description is omitted herein for simplicity.

The object identification method can utilize the first dimension and the second dimension to respectively weight the first similarity and the second similarity, and execute step S118 to compare the computed value computed by the weighted first similarity and the weighted second similarity with the predefined threshold, for determining whether the first object O1 and the second object O2 are the same one. As shown in FIG. 2 to FIG. 13, the first object O1 and the second object O2 inside the first angle of view A1 have large dimensions (which are larger than the small object inside the second angle of view A2) and can provide more characteristic values or vectors for similarity comparison, so that the first similarity can be matched with the greater weighting value (such as the first dimension), and the second similarity has inferior accuracy and can be matched with the lower weighting value (such as the second dimension).

Figure 16:
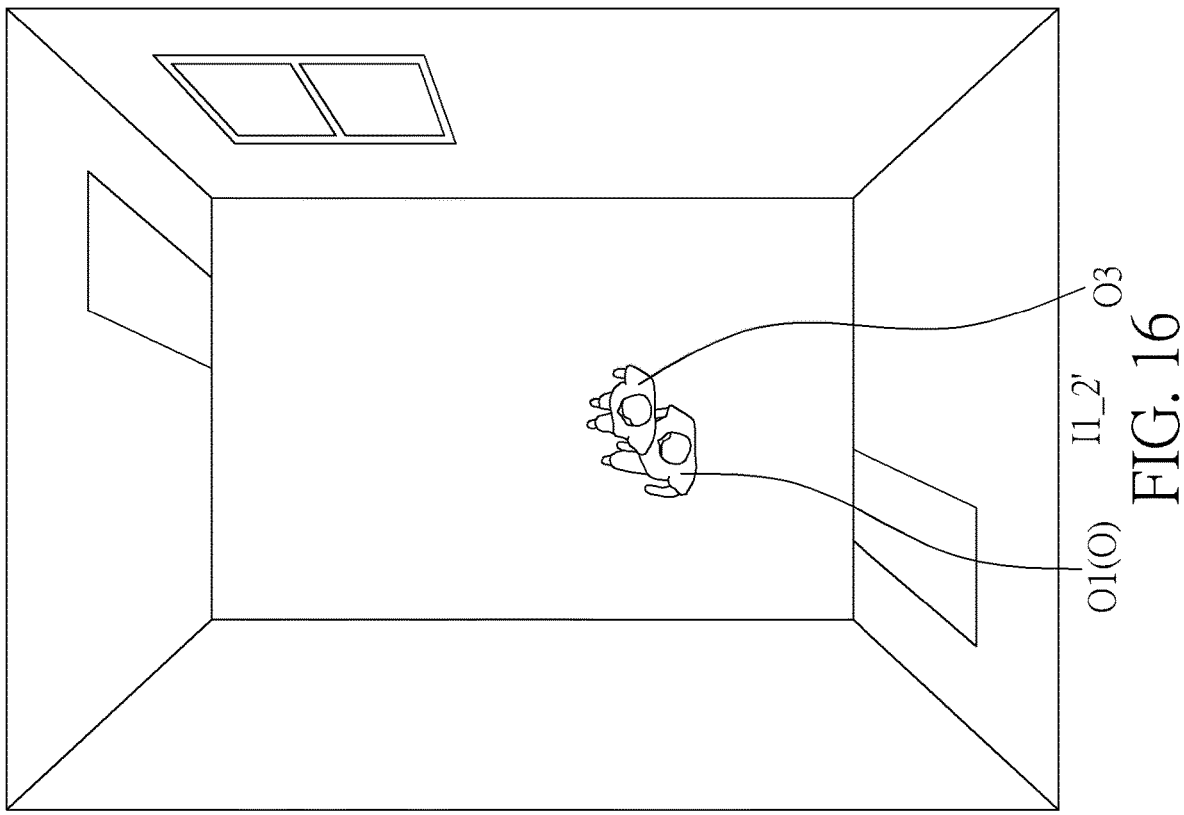
FIG. 15 and FIG. 16 are diagrams of images acquired by the monitoring camera apparatus in one possible specific condition according to the first embodiment of the present invention.
Figure 15:
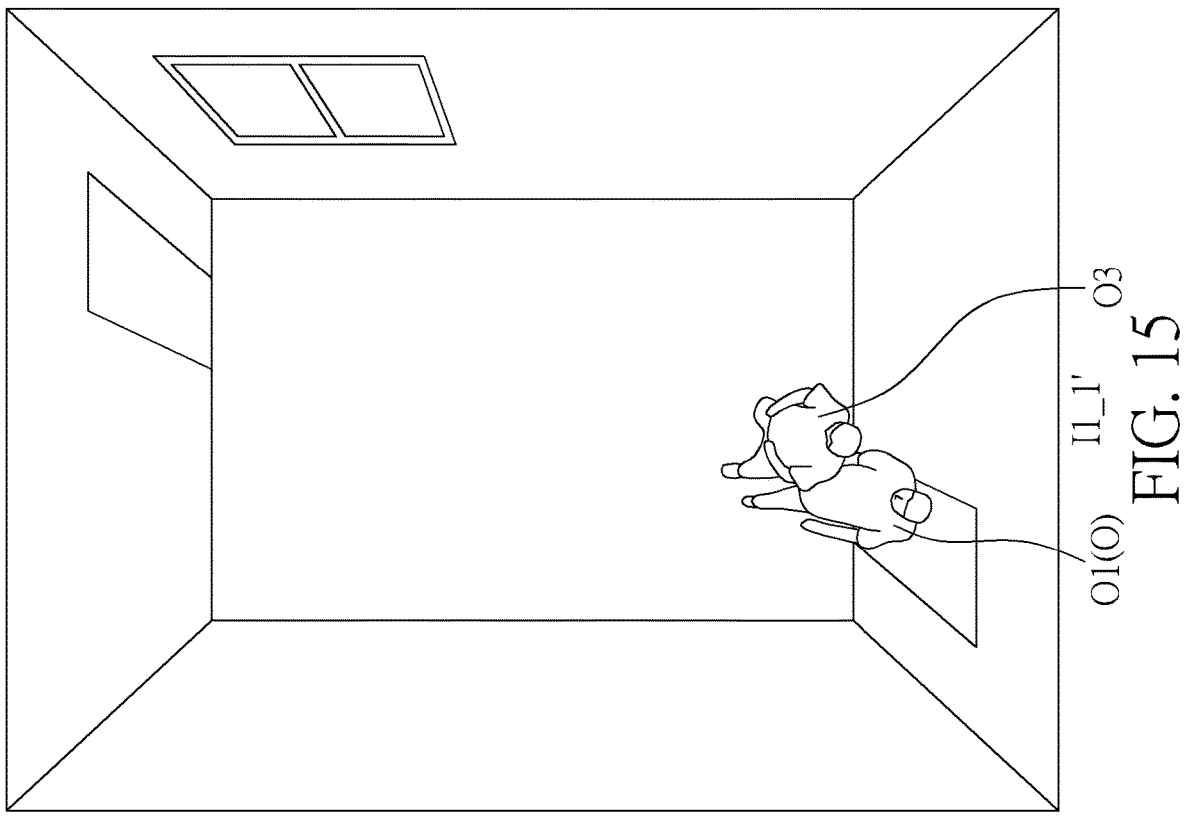

In some specific conditions, a plurality of objects appearing inside the same angle of view of the monitoring range R may be overlapped to each other. Please refer to FIG. 15 and FIG. 16. FIG. 15 and FIG. 16 are diagrams of images acquired by the monitoring camera apparatus 10 in one possible specific condition according to the first embodiment of the present invention. An extra object O3 may hide a part of the first object O1, and therefore the object identification method can compute a first visible area ratio relevant to the first object O1 inside the first angle of view A1 of the first monitoring image I1_1' and the second object O2 inside the first angle of view A1 of the second monitoring image I2_1, and a second visible area ratio relevant to the first object O1 inside the second angle of view A2 of the first monitoring image I1_2' and the second object O2 inside the second angle of view A2 of the second monitoring image I2_12.

In one embodiment, a hiding dimension of the first object O1 hid by the extra object O3 can be acquired, and a hiding ratio of the hiding dimension to a whole dimension of the first object O1 can be acquired, and then the first visible area ratio can be computed by subtracting the hiding ratio from a visible dimension of the first object O1 inside the first angle of view A1 of the first monitoring image I1_1'; the visible area ratio of other objects in the monitoring image can be computed accordingly, and therefore the embodiment can search one or several objects with more characteristic information inside the monitoring images for identification. In other possible embodiment, the present invention can acquire a bounding box of each object, and then utilize a size of the bounding box of the said object hidden by the bounding box of the extra object to compute the visible area ratio. However, computation of the visible area ratio is not limited to the above-mentioned embodiments, and any method of computing the visible area ratio about one object hidden by another object in the monitoring image belongs to an actual application of the present invention.

As the embodiment shown in FIG. 15 and FIG. 16, the first visible area ratio inside the first angle of view A1 of the first monitoring image I1_1' can be greater than the second visible area ratio inside the second angle of view A2 of the first monitoring image I1_2', so that the first similarity and the second similarity in step S118 can be weighted respectively by the high weighting value and the low weighting value, and then the computed value computed by the weighted first similarity and the weighted second similarity can be compared with the predefined threshold, for determining whether the first object O1 and the second object O2 are the same one. It should be mentioned that the object identification method of the present invention can optionally decide whether the first visible area ratio and/or the second visible area ratio is over a ratio threshold for a start. If the first visible area ratio and/or the second visible area ratio does not exceed the ratio threshold, the object in the said angle of view is hidden by the extra object O3 in a large scale manner and provides the unsatisfactory characteristic values or vectors, so that this set of the first monitoring image and the second monitoring image can be ignored. If the first visible area ratio and/or the second visible area ratio exceed the ratio threshold, the first visible area ratio and the second visible area ratio can be weighting values for adjustment of the first similarity and the second similarity.

Figure 17:
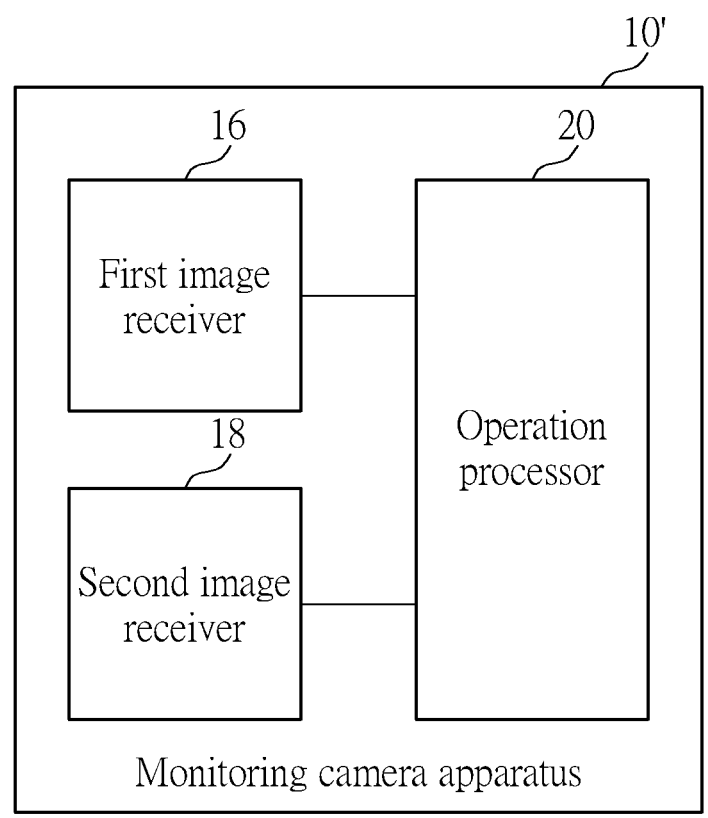
FIG. 17 is a functional block diagram of the monitoring camera apparatus according to a second embodiment of the present invention.
Figure 19:
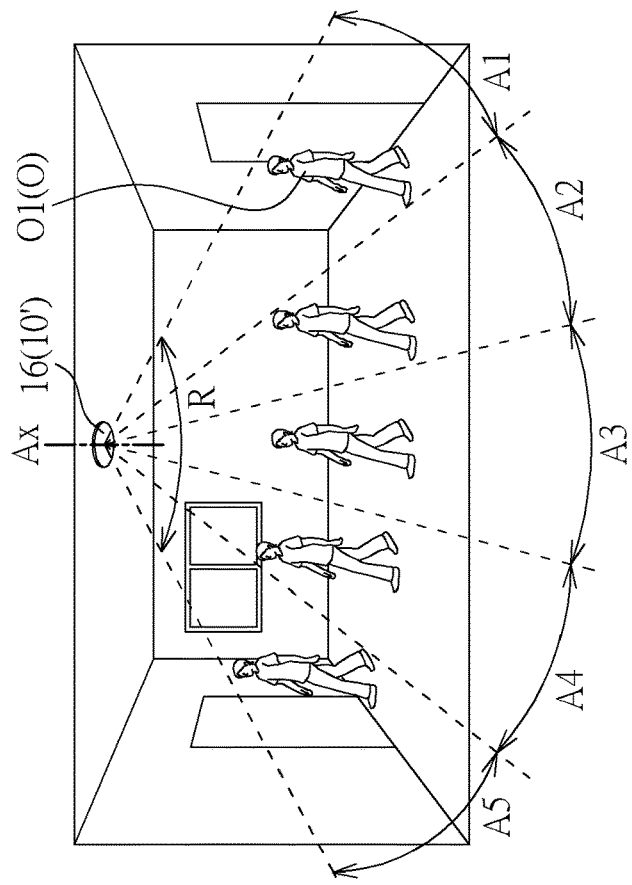
FIG. 18 and FIG. 19 are diagrams of positions of the object passing the monitoring range of the monitoring camera apparatus in different points of time according to the second embodiment of the present invention.
Figure 18:
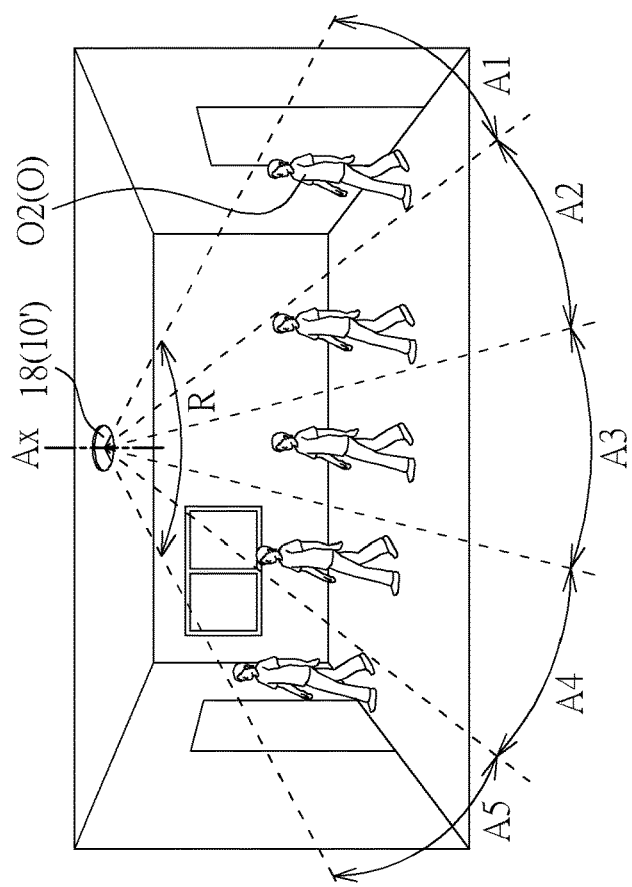

Please refer to FIG. 17 to FIG. 19. FIG. 17 is a functional block diagram of the monitoring camera apparatus 10' according to a second embodiment of the present invention. FIG. 18 and FIG. 19 are diagrams of positions of the object O passing the monitoring range R of the monitoring camera apparatus 10' in different points of time according to the second embodiment of the present invention. The monitoring camera apparatus 10' can include a first image receiver 16, a second image receiver 18 and an operation processor 20 electrically connected with each other. The first image receiver 16 and the second image receiver 18 can respectively capture the first monitoring image and the second monitoring image, or can respectively receive the first monitoring image and the second monitoring image captured by the external camera. In the second embodiment, setting of the angles of view where the object is located inside the monitoring image can be similar to the first embodiment, and a detailed description is omitted herein for simplicity. The first image receiver 16 and the second image receiver 18 can be respectively disposed on two connected or adjacent hallways, which means the object O can leave the monitoring range R of the first image receiver 16 and then immediately enter the monitoring range R of the second image receiver 18. The second embodiment can divide the monitoring range R into five angles of view A1~A5 via the central axis Ax, as the first embodiment shown in FIG. 2.

The operation processor 20 can execute the object identification method as mentioned above. First, the object identification method can analyze the first object O1 inside the first angle of view A1 of the first image receiver 16, and the second object O2 inside the first angle of view A1 of the second image receiver 18; in the meantime, the first angle of view A1 of the first monitoring image acquired by the first image receiver 16 and the first angle of view A1 of the second monitoring image acquired by the second image receiver 18 can be located on the same side of the central axis Ax. Then, the object identification method can estimate similarity of the objects O1 and O2, and determine whether the first object O1 and the second object O2 are the same according to a comparison of the similarity with the predefined threshold. As the said first embodiment, the second embodiment can synthetically determine similarities of the objects inside the angles of view A1~A5 to increase the identification accuracy, or can further analyze the dimension and/or the visible area ratio of the object inside each angle of view A1~A5, so as to increase the identification accuracy by weighting the similarities.

In conclusion, the monitoring camera apparatus can capture the monitoring images about the object located inside all the angles of view when the object enters and leaves the monitoring range. For effectively increasing the object identification accuracy, the object identification method of the present invention can acquire the characteristic values or vectors about the object located inside the same angle of view of the first monitoring image and the second monitoring image when the object moves in different directions. The characteristic values or vectors acquired by the monitoring images, which contain the object located inside the same or approximate angle of view, can be compared for improving identification misjudgment resulted from angle difference of view. Besides, the object identification method can utilize some information of the object, such as the dimension and/or the visible area ratio, to estimate the related similarity via weighting adjustment, so as to provide the preferred object identification accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object identification method of determining whether a first monitoring image and a second monitoring image captured by a monitoring camera apparatus have the same object, the object identification method comprising:

acquiring the first monitoring image at a first point of time to analyze a first object inside a first angle of view of the first monitoring image, wherein a plurality of angles of view is defined within the first monitoring image along a first direction, and the first angle of view of the first monitoring image is a beginning of the plurality of angles of view within the first monitoring image;

acquiring the second monitoring image at a second point of the time different from the first point of time to analyze a second object inside the first angle of view of the second monitoring image, wherein other plurality of angles of view is defined within the second monitoring image along a second direction different from the first direction, and the first angle of view of the second monitoring image is a beginning of the plurality of angles of view within the second monitoring image;

estimating a first similarity between the first object inside the first angle of view of the first monitoring image and the second object inside the first angle of view of the second monitoring image; and determining whether the first object and the second object are the same one according to a comparison result of the first similarity with a threshold.

2. The object identification method of claim 1, wherein the monitoring camera apparatus comprises an image receiver, a monitoring range of the image receiver has a central axis, and the first angle of view in the first monitoring image and the first angle of view in the second monitoring image are symmetrically located on two opposite sides of the central axis.

3. The object identification method of claim 1, wherein the monitoring camera apparatus comprises two image receivers, a monitoring range of each of the two image receivers has a central axis, and the first angle of view in the first monitoring image and the first angle of view in the second monitoring image are located on the same side of the central axis.

4. The object identification method of claim 1, wherein the monitoring camera apparatus further captures another first monitoring image at a third point of time, and another second monitoring image at a fourth point of the time different from the third point of time, the object identification method comprises:

analyzing the first object inside a second angle of view of the another first monitoring image;

analyzing the second object inside the second angle of view of the another second monitoring image;

estimating a second similarity between the first object inside the second angle of view of the another first monitoring image and the second object inside the second angle of view of the another second monitoring image; and determining whether the first object and the second object are the same one according to a comparison result of a computed value computed by the first similarity and the second similarity with the threshold.

5. The object identification method of claim 4, further comprising:

computing a first dimension relevant to the first object inside the first angle of view of the first monitoring image and the second object inside the first angle of view of the second monitoring image;

computing a second dimension relevant to the first object inside the second angle of view of the another first monitoring image and the second object inside the second angle of view of the another second monitoring image;

utilizing the first dimension and the second dimension to respectively weight the first similarity and the second similarity; and determining whether the first object and the second object are the same one according to a comparison result of another computed value computed by the weighted first similarity and the weighted second similarity with the threshold.

6. The object identification method of claim 4, further comprising:

computing a first visible area ratio relevant to the first object inside the first angle of view of the first monitoring image and the second object inside the first angle of view of the second monitoring image;

computing a second visible area ratio relevant to the first object inside the second angle of view of the another first monitoring image and the second object inside the second angle of view of the another second monitoring image;

utilizing the first visible area ratio and the second visible area ratio to respectively weight the first similarity and the second similarity; and determining whether the first object and the second object are the same one according to a comparison result of another computed value computed by the weighted first similarity and the weighted second similarity with the threshold.

7. The object identification method of claim 6, further comprising:

determining whether the first visible area ratio and/or the second visible area ratio is over a ratio threshold; and deciding a weighting value of the first visible area ratio and/or the second visible area ratio according to a determination result.

8. The object identification method of claim 1, wherein the monitoring camera apparatus further captures another second monitoring image at another point of the time different from the first point and the second point of time, the object identification method analyses whether the first monitoring image and the another second monitoring image have the same object, and decides the first monitoring image corresponds to the second monitoring image or the another second monitoring image according to an analysis result.

9. A monitoring camera apparatus, comprising:

an image receiver capturing a first monitoring image and a second monitoring image; and an operation processor electrically connected to the image receiver, the operation processor acquiring the first monitoring image at a first point of time to analyze a first object inside a first angle of view of the first monitoring image, acquiring the second monitoring image at a second point of the time different from the first point of time to analyze a second object inside the first angle of view of the second monitoring image, estimating a first similarity between the first object inside the first angle of view of the first monitoring image and the second object inside the first angle of view of the second monitoring image, and determining whether the first object and the second object are the same one according to a comparison result of the first similarity with a threshold, so as to determining whether the first monitoring image and the second monitoring image have the same object;

wherein a plurality of angles of view is defined within the first monitoring image along a first direction, and the first angle of view of the first monitoring image is a beginning of the plurality of angles of view within the first monitoring image;

wherein other plurality of angles of view is defined within the second monitoring image along a second direction different from the first direction, and the first angle of view of the second monitoring image is a beginning of the plurality of angles of view within the second monitoring image.

10. The monitoring camera apparatus of claim 9, wherein a monitoring range of the image receiver has a central axis, and the first angle of view in the first monitoring image and the first angle of view in the second monitoring image are symmetrically located on two opposite sides of the central axis.

11. The monitoring camera apparatus of claim 9, wherein the image receiver further captures another first monitoring image at a third point of time, and another second monitoring image at a fourth point of the time different from the third point of time, the operation processor further analyzes the first object inside a second angle of view of the another first monitoring image, analyzes the second object inside the second angle of view of the another second monitoring image, estimates a second similarity between the first object inside the second angle of view of the another first monitoring image and the second object inside the second angle of view of the another second monitoring image, and determines whether the first object and the second object are the same one according to a comparison result of a computed value computed by the first similarity and the second similarity with the threshold.

12. The monitoring camera apparatus of claim 11, wherein the operation processor further computes a first dimension relevant to the first object inside the first angle of view of the first monitoring image and the second object inside the first angle of view of the second monitoring image, computes a second dimension relevant to the first object inside the second angle of view of the another first monitoring image and the second object inside the second angle of view of the another second monitoring image, utilizes the first dimension and the second dimension to respectively weight the first similarity and the second similarity, and determines whether the first object and the second object are the same one according to a comparison result of another computed value computed by the weighted first similarity and the weighted second similarity with the threshold.

13. The monitoring camera apparatus of claim 11, wherein the operation processor further computes a first visible area ratio relevant to the first object inside the first angle of view of the first monitoring image and the second object inside the first angle of view of the second monitoring image, computes a second visible area ratio relevant to the first object inside the second angle of view of the another first monitoring image and the second object inside the second angle of view of the another second monitoring image, utilizes the first visible area ratio and the second visible area ratio to respectively weight the first similarity and the second similarity, and determines whether the first object and the second object are the same one according to a comparison result of another computed value computed by the weighted first similarity and the weighted second similarity with the threshold.

14. The monitoring camera apparatus of claim 9, wherein the monitoring camera apparatus further captures another second monitoring image at another point of the time different from the first point and the second point of time, the object identification method analyses whether the first monitoring image and the another second monitoring image have the same object, and decides the first monitoring image corresponds to the second monitoring image or the another second monitoring image according to an analysis result.

15. A monitoring camera apparatus, comprising:
a first image receiver capturing a first monitoring image;
a second image receiver capturing a second monitoring image; and
an operation processor electrically connected to the first image receiver and the second image receiver, the operation processor acquiring the first monitoring image at a first point of time to analyze a first object inside a first angle of view of the first monitoring image, acquiring the second monitoring image at a second point of the time different from the first point of time to analyze a second object inside the first angle of view of the second monitoring image, estimating a first similarity between the first object inside the first angle of view of the first monitoring image and the second object inside the first angle of view of the second monitoring image, and determining whether the first object and the second object are the same one according to a comparison result of the first similarity with a threshold, so as to determining whether the first monitoring image and the second monitoring image have the same object;
wherein a plurality of angles of view is defined within the first monitoring image along a first direction, and the first angle of view of the first monitoring image is a beginning of the plurality of angles of view within the first monitoring image;
wherein other plurality of angles of view is defined within the second monitoring image along a second direction different from the first direction, and the first angle of view of the second monitoring image is a beginning of the plurality of angles of view within the second monitoring image.

16. The monitoring camera apparatus of claim 15, wherein a monitoring range of each of the first image receiver and the second image receiver has a central axis, and the first angle of view in the first monitoring image and the first angle of view in the second monitoring image are located on the same side of the central axis.

17. The monitoring camera apparatus of claim 15, wherein the image receiver further captures another first monitoring image at a third point of time, and another second monitoring image at a fourth point of the time different from the third point of time, the operation processor further analyzes the first object inside a second angle of view of the another first monitoring image, analyzes the second object inside the second angle of view of the another second monitoring image, estimates a second similarity between the first object inside the second angle of view of the another first monitoring image and the second object inside the second angle of view of the another second monitoring image, and determines whether the first object and the second object are the same one according to a comparison result of a computed value computed by the first similarity and the second similarity with the threshold.

18. The monitoring camera apparatus of claim 17, wherein the operation processor further computes a first dimension relevant to the first object inside the first angle of view of the first monitoring image and the second object inside the first angle of view of the second monitoring image, computes a second dimension relevant to the first object inside the second angle of view of the another first monitoring image and the second object inside the second angle of view of the another second monitoring image, utilizes the first dimension and the second dimension to respectively weight the first similarity and the second similarity, and determines whether the first object and the second object are the same one according to a comparison result of another computed value computed by the weighted first similarity and the weighted second similarity with the threshold.

19. The monitoring camera apparatus of claim 17, wherein the operation processor further computes a first visible area ratio relevant to the first object inside the first angle of view of the first monitoring image and the second object inside the first angle of view of the second monitoring image, computes a second visible area ratio relevant to the first object inside the second angle of view of the another first monitoring image and the second object inside the second angle of view of the another second monitoring image, utilizes the first visible area ratio and the second visible area ratio to respectively weight the first similarity and the second similarity, and determines whether the first object and the second object are the same one according to a comparison result of another computed value computed by the weighted first similarity and the weighted second similarity with the threshold.

20. The monitoring camera apparatus of claim 15, wherein the monitoring camera apparatus further captures another second monitoring image at another point of the time different from the first point and the second point of time, the object identification method analyses whether the first monitoring image and the another second monitoring image have the same object, and decides the first monitoring image corresponds to the second monitoring image or the another second monitoring image according to an analysis result.

* * * * *